(12) United States Patent
Merritt

(10) Patent No.: US 11,136,505 B2
(45) Date of Patent: Oct. 5, 2021

(54) POTASSIUM HUMATE SULFUR COMPOUND GRANULE

(71) Applicant: Kevin Merritt, St. Augustine, FL (US)

(72) Inventor: Kevin Merritt, St. Augustine, FL (US)

(*) Notice: Subject to any disclaimer, the term of this patent is extended or adjusted under 35 U.S.C. 154(b) by 167 days.

(21) Appl. No.: 16/266,749

(22) Filed: Feb. 4, 2019

(65) Prior Publication Data

US 2020/0148952 A1    May 14, 2020

Related U.S. Application Data

(63) Continuation-in-part of application No. 15/878,782, filed on Jan. 24, 2018, which is a continuation-in-part of application No. 14/738,865, filed on Jun. 13, 2015, now Pat. No. 9,914,670.

(60) Provisional application No. 62/013,789, filed on Jun. 18, 2014.

(51) Int. Cl.
| | | |
|---|---|---|
| C09K 17/50 | (2006.01) | |
| C05F 11/02 | (2006.01) | |
| C05G 5/12 | (2020.01) | |
| C09K 101/00 | (2006.01) | |

(52) U.S. Cl.
CPC .............. C09K 17/50 (2013.01); C05F 11/02 (2013.01); C05G 5/12 (2020.02); *C09K 2101/00* (2013.01)

(58) Field of Classification Search
CPC . C05F 11/02; C05F 11/08; C05G 5/12; C05B 17/00; C05B 19/00
See application file for complete search history.

(56) References Cited

U.S. PATENT DOCUMENTS

| | | | |
|---|---|---|---|
| 2,992,093 A * | 7/1961 | Burdick | C08H 99/00 |
| | | | 71/24 |
| 3,700,728 A | 10/1972 | Moschopedis et al. | |
| 3,932,166 A | 1/1976 | Vignovich et al. | |
| 4,015,972 A | 4/1977 | Watkins et al. | |
| 4,459,149 A | 7/1984 | Moran et al. | |
| 5,026,416 A | 6/1991 | Alexander | |
| 5,034,045 A | 7/1991 | Alexander | |
| 5,876,479 A | 3/1999 | Hedgpeth | |
| 6,783,567 B1 * | 8/2004 | Waters | C05D 9/00 |
| | | | 71/24 |
| 8,388,722 B2 | 3/2013 | Lynch et al. | |
| 9,914,670 B1 | 3/2018 | Merritt | |
| 10,597,337 B1 | 3/2020 | Merritt | |
| 10,723,667 B1 | 7/2020 | Merritt | |
| 2005/0039509 A1 | 2/2005 | Muma | |
| 2008/0216534 A1 | 9/2008 | Karr | |
| 2011/0259067 A1 | 10/2011 | Lynch | |
| 2013/0239633 A1 | 9/2013 | Halos | |
| 2016/0200634 A1 | 7/2016 | Zaseybida | |
| 2016/0229761 A1 | 8/2016 | Cherry et al. | |
| 2017/0334795 A1 | 11/2017 | Cherry et al. | |
| 2018/0311712 A1 | 11/2018 | Le | |
| 2020/0148952 A1 | 5/2020 | Merritt | |
| 2020/0270183 A1 | 8/2020 | Merritt | |

FOREIGN PATENT DOCUMENTS

| | | |
|---|---|---|
| CN | 1026095 C | 10/1994 |
| CN | 101024590 B | 11/2010 |
| CN | 101905983 A | 12/2010 |
| CN | 202148263 U | 2/2012 |
| CN | 101768019 B | 12/2012 |
| CN | 102898254 A | 1/2013 |
| CN | 102942417 A | 2/2013 |
| CN | 101935243 B | 7/2013 |
| CN | 102875248 B | 10/2014 |
| CN | 104892296 A | 9/2015 |
| EP | 1216976 A2 | 6/2002 |
| IN | 02359CH2010 | 9/2010 |
| RU | 2443663 C1 | 2/2012 |
| RU | 2491266 C1 | 1/2013 |
| WO | 9533702 A2 | 12/1995 |
| WO | 2010094985 A1 | 8/2010 |
| WO | 2013057168 A2 | 4/2013 |

OTHER PUBLICATIONS

Saint Humic Acid "Potassium humate technical data sheet" <https://www2.slideshare.net/SAINTHUMICACID/potassium-humate-technical-data-sheet-81883698> Nov. 11, 2017 (Year: 2017).*
IPCO "Rotoform pastillation for sulphur bentonite" <https://ipco.com/wp-content/uploads/2018/03/IPCO_IP_Sulphur-Bentonite_2018.pdf> Mar. 2018 (Year: 2018).*
Huey, Lee J., Osumanu H. Ahmed, and Nik MA Majid. "Effects of Extractants on the Yields and Selected Chemical Characteristics of Humic Acids Isolated from Tropical Saprists Peat." American Journal of Applied Sciences 7.7 (2010): 933. (Year: 2010).*
Wang et al., Evaluation of Methods of Determining Humic Acids in Nucleic Acid Samples for Molecular Biological Analysis, Biosci. Biotechnol. Biochem., 75(2), 355-357, 2011.
AGN Microbial Selection and Sub-Profiling, Cisbay, www.cisbay.com.
Van Zomeren, Measurement of Humic and Fulvic Acid Concentrations and Dissolution Properties by a Rapid Batch Procedure, Environ. Sci. Technol., 41 (19), pp. 6755-6761, 2007.
Babalola, Beneficial bacteria of agricultural importance, Biotechnol Lett, 32, 1559-1570, 2010.
Comans et al., Concentrations of total dissolved organic carbon and humic and hydrophilic sub-fractions extracted from major Dutch soil types and their relation with soil properties, Geophysical Research Abstractsvol. 15, EGU2013-13841, 2013.

(Continued)

*Primary Examiner* — Jennifer A Smith
(74) *Attorney, Agent, or Firm* — Middleton Reutlinger

(57) ABSTRACT

Disclosed is a potassium humate sulfur compound granule and process for making the same granule. The potassium humate sulfur compound granule including a potassium humate component and an elemental sulfur component at a ratio of about 1:20; where the potassium humate component of the granule fully solubilizes upon application to a desired site and enhances conversion of the sulfur component into sulfate by at least about 15% as compared to elemental sulfur alone.

16 Claims, No Drawings

(56) References Cited

OTHER PUBLICATIONS

Grow More; Humic/Fulvic Acids, pp. 1-7, Dec. 31, 2003.
Halliday, The relationship between Humalite, Leonardite, and Fertilizers, Black Earth, 2015.
Humic Growth Solutions; Diamond-Grow Organic 100% Water Soluble Spray Dried Humic Acid Powder, pp. 1-2, Jacksonville, FL Dec. 31, 2013.
TOPP, Bacteria in agricultural soils: Diversity, role and future perspectives, Canadian Journal of Soil Science, 83, 303-309, 2003.
Javanshah et al., Determination of Humic Acid by Spectrophotometric Analysis in the Soils, International Journal of Advanced Biotechnology and Research (IJBR), vol. 7, pp. 19-23, Special Issue—Apr. 2016.
Lamar et al., A New Standardized Method for Quantification of Humic and Fulvic Acids in Humic Ores and Commercial Products, Journal of AOAC International, 97, 721-730, 2014.
Mineral Logic, LLC, Bioactive Fulvic, Testing Method, Natural Organic Matter Research, 2017.
Myneni, Functional Group Chemistry of Humic Substances, Molecular Environmental Geochemistry Group, The Department of Geosciences, Princeton University, Guyot Hall Princeton, NJ 08544.
Jacob, Kenneth Donald, et al. The composition and distribution of phosphate rock with special reference to the United States No. 1488-2016-124804. 1933.
Lindenmayer, R. "Zinc Fertilization: A Review of Scientific Literature." (2007).
Degryse, Fien, et al. "Uptake of elemental or sulfate-S from fall-or spring-applied co-granulated fertilizer by corn—A stable isotope and modeling study." Field crops research 221 (2018): 322-332.
Canadian Patent Application 3,070,820 filed Feb. 4, 2020 titled Potassium Humate Sulfur Compound Granule.
Mexican Patent Application MX/A/2020/001397 filed Feb. 4, 2020 titled Potassium Humate Sulfur Compound Granule.
Canadian Patent Application 3,077,954 filed Apr. 15, 2020 titled Process for Making a Composite Granule With Rock Phosphate, Sulfur, and Humic Acid.
Mexican Patent Applicantion MX/a/2020/004003 filed Apr. 20, 2020 titled Process for Making a Composite Granule With Rock Phosphate, Sulfur, and Humic Acid.

Baloach, et al. "Integrated effect of phosphate solubilizing bacteria and humic acid on physiomorphic attributes of maize." International Journal of Current Microbiology and Applied Sciences 3.6 (2014): 549-554.
Sharma, A. K., Seema Wahab, and Rashmi Srivastava, eds. Agriculture diversification: problems and perspectives. IK International Pvt Ltd, 2010.
Environmental Fertilisers. "EF Soluble Humate Granules". pp. 1-2. <http://environmentalfertilisers.co.nz/ef-soluble-humate-granules/> Jun. 21, 2013.
Wikipedia. "Potassium humate". <https://en.wikipedia.org/wiki/Potassium_humate> Mar. 7, 2013.
The Andersons. Products—Andersons Humates | Humic DG. <https://andersonshumates.com/products/> May 21, 2013.
Humic DG Product Label, 2016.
Hiroyuki, Interactions of Methylotrophs with Plants and Other Heterotrophic Bacteria, Microorganisms 2015, 3, 137-151; doi: 10.3390/microorganisms3020137, www.mdpi.com/journal/microorganisms, Apr. 2, 2015.
U.S. Appl. No. 16/210,646, filed Dec. 5, 2018 titled Process for Making a Semi-Soluble Granule Compnsing Rock Phosphate and Humic Acid.
U.S. Appl. No. 16/814,539, filed Mar. 10, 2020 titled Process for Making a Fully Water-Soluble Granule Comprising Humic Acid and a Microbial Community Composition.
U.S. Appl. No. 16/924,856, filed Jul. 9, 2020 titled Potassium Humate Zinc Sulfate Compound.
U.S. Appl. No. 17/206,053, filed Mar. 18, 2021 titled Process for Making a Semi-Soluble Humic Granule.
United States Patent Office, Notice of Allowance in U.S. Appl. No. 16/210,646 dated Apr. 1, 2021.
United States Patent Office, Final Office Action in U.S. Appl. No. 16/266,749 dated Apr. 5, 2021.
United States Patent Office, Non-Final Office Action in U.S. Appl. No. 16/814,539 dated Jul. 26, 2021.
Granular Myco (GreenGro Biologicals) <https:/www.thegreengro.com/product/granular-myco/> Oct. 23, 2017 (Year 2017).
Premium Ultrafine (GreenGro Biologicals) <https://www.thegreengro.com/product/premium-ultrafine/> 2017 (Year 2017).
Maxwell. "HumiMax" <https://d2j31icv6dlhz6.cloudfront.net/O/16EACbqUqFlemViO7sUS/maxwell-humimax-leaflet-2019.pdf> 2019 (Year: 2019).
Fulton, John, and Kaylee Port. "Physical properties of granular fertilizers and impact on spreading." Ohio State University, FABE-550.1 (2016). (Year: 2016).

\* cited by examiner

POTASSIUM HUMATE SULFUR COMPOUND GRANULE

FIELD OF THE INVENTION

A process such as is described in various embodiments herein relates to making a humic acid sulfur compound granule. Such a compound granule is useful as an organic aid to crop growth as well as useful for overcoming a plethora of soil problems.

BACKGROUND OF THE INVENTION

Extraction of humic acid and related materials from carbonaceous raw materials such as humalite, leonardite, sub-bituminous coal, menefee, peat, and the like has been practiced for years and is accordingly known in the art. Process steps vary, but the process output is generally a particulate material with suboptimal solubility in water.

It is known that humic substances (HS) include fulvic acid, humic acid, and/or humin. Of these, fulvic acid has the lowest molecular weight and least resistance to decomposition by microorganisms; humin has the highest molecular weight and greatest resistance to decomposition, because it has a large number of negative charges per unit mass, humin also has a very high CEC. The large molecules of humus bind to clay particles and greatly increase aggregate formation and stability therefore improving soil properties. Humin is the alkali (and acid) insoluble portion of HS that many manufacturers dispose of, although it is known that there are individuals who may extract and use it.

Since it takes longer for dry lignite to be broken down, and thus be functional in the soil, it is necessary to convert the lignite into forms that provide a more timely overall benefit (e.g. transformation into a water-soluble form). Such a conversion "unrolls" the tight molecular ball of lignite and creates water-soluble humic acids, either as a liquid or in the form of sodium, potassium, or ammonium salts (known as humates). Such a water-soluble form is desirable, as in their soluble form, humic acids can readily chelate nutrients, preserve nitrates from leaching, enhance root development, and improve overall crop vigor and yields.

In addition to the desirability of a fully water-soluble humic acid composition various soil and tissue analyses have indicated a lack of ample sulfur exists in many agricultural soils. This lack of available sulfur combined with nitrogen to sulfur ratios influence crop yield and quality. Sulfur plays a distinctive and visible role in protein synthesis, producing amino acids, enzymes, and vitamins. Sulfur also helps soils fortify plant resistance to disease. Therefore, it may be desirable to combine fully-water soluble humic acid (i.e. humates) and sulfur into a granule for application to soil. The combinatorial chemistry of the fully soluble humic acid (i.e. humate) and sulfur may serve as a catalyst for the production of sulfates and sulfuric acids and construct a sulfur reserve within the soil.

SUMMARY OF EMBODIMENTS

The present embodiments provide one or more of the features recited in the appended claims and/or the following features which alone or in combination, may comprise patentable subject matter.

In a first aspect, a process for making a potassium humate sulfur compound granule is described. The process including: obtaining a sample of a carbonaceous substance comprising humic acid and one or more other substances; contacting the sample with an amount of an alkaline mixture, forming an extraction mixture, the extraction mixture consisting essentially of a sludge component, the sludge component including, predominantly, the sample, and an extraction component, the extraction component including, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, forming a plurality of potassium humate powder particles; adding the plurality of potassium humate particles to elemental sulfur, forming a homogenized mixture; and solidifying at least a portion of the homogenized mixture under conditions where the at least a portion of the homogenized mixture is made into a form of a granule; thereby making a potassium humate sulfur compound granule.

In some embodiments, the elemental sulfur is a molten sulfur. In some embodiments, the homogenized mixture includes about 1 pound to about 200 pounds of the plurality of potassium humate powder particles per one ton (2000 pounds) of elemental sulfur. In other embodiments, the homogenized mixture includes about 100 pounds of the plurality of potassium humate powder particles per one ton of elemental sulfur. In still other embodiments, the plurality of potassium humate powder particles comprises about 5% of the homogenous mixture.

In some embodiments, the potassium humate sulfur compound granule has a pH of at least 7.5. In other embodiments, the potassium humate sulfur compound granule has a pH of 7.5 to about 12. In still other embodiments, the potassium humate sulfur compound granule has a pH of about 9.

In some embodiments, the homogenized mixture further includes bentonite clay as a binder. In such instances, the bentonite clay may comprise about 10% of the homogenized mixture.

In some embodiments, the solidifying step further includes pumping the homogenized mixture through a rotoformer or drop former and onto a flat surface (e.g. a conveyor belt, or the like) and cooling the homogenized mixture on the flat surface.

In another aspect a process for making a potassium humate sulfur compound granule is disclosed, where the process includes: obtaining a sample of a carbonaceous substance comprising humic acid and one or more other substances; contacting the sample with an amount of an alkaline mixture, forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, forming a plurality of powder potassium humate particles; adding the plurality of potassium humate particles to elemental sulfur, forming a homogenized mixture, where the plurality of potassium humate powder particles comprises about 5% of the homogenized mixture; and solidifying at least a portion of the homogenized mixture under conditions where the at least a portion of the homogenized mixture is made into a form of a granule; thereby making a potassium humate sulfur compound granule with a potassium humate component and a sulfur component, where the potassium humate sulfur compound granule has a pH of 7.5 to about 12, and where the potassium humate component of the granule solubilizes upon application to a desired site and enhances conversion of the sulfur component into sulfate.

In some embodiments, the potassium humate sulfur compound granule has a pH of about 9. In some embodiments, the homogenized mixture further includes bentonite clay as a binder. In such embodiments, the bentonite clay may comprise about 10% of the homogenized mixture.

In some embodiments, the solidifying step further includes pumping the homogenized mixture through a rotoformer and onto a flat surface and cooling the homogenized mixture on the flat surface.

In another aspect, a potassium humate sulfur compound granule is disclosed, where the granule includes: a potassium humate component and an elemental sulfur component at a ratio of about 1:20; where the potassium humate sulfur compound granule is semi-soluble, where the potassium humate component of the granule fully solubilizes upon application to a desired site and enhances conversion of the sulfur component into sulfate by at least about 15% as compared to elemental sulfur alone; and where the potassium humate sulfur compound granule has a pH of 7.5 to about 12.

In some embodiments, the granule has a pH of about 9. In some embodiments, the granule enhances conversion of the sulfur component into sulfate by at least 50% as compared to elemental sulfur alone. In some embodiments, the granule further includes bentonite clay component as a binder.

DETAILED DESCRIPTION

A process and composition such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

When used in this specification and the claims, "humate" refers to a fully-water soluble humic acid composition in the form of a salt. For example "potassium humate" is a fully-water soluble potassium salt of humic acid, "ammonium humate" is a fully-water soluble ammonium salt of humic acid, and so on.

Aspects of a process such as is described in various embodiments herein are further illustrated by the following examples, which are set forth to illustrate certain aspects of a process such as is described in various embodiments herein and are not to be construed as limiting thereof.

In an example, production of a potassium humate sulfur compound granule was undertaken as a multi-step process. This process includes blending of raw material and an alkaline mixture in a blend tank; screening of the blended mixture that was made in the blend tank; drying of the liquid derived from screening of the blended mixture, thereby forming a fine potassium humate powder; adding the fine powder to molten sulfur, forming a homogenized mixture; and solidifying of the homogenized mixture to form potassium humate sulfur compound granules.

In an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to Humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the insoluble sand, clay, and humin fraction, also known as sludge. The amount of sludge varied, but typically the sludge was about 5-7% of the total weight of the blended mixture.

In an example, the screened humic acid enriched liquid, which had a density of 8.35-9 lb/gallon, was collected in an insulation tank, which had a capacity of 12500 gal. The humic acid enriched liquid was pumped from the insulation tank to a spray dryer firing tank from which it was transferred to a spray dryer.

In an example, a spray dryer system comprised a burner, a dryer, two cyclone separators, a baghouse and a powder hopper. Humic acid enriched liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The humic acid enriched liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a humic acid enriched powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The potassium humate or humic acid enriched powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the potassium humate powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns.

The fine 100% soluble potassium humate powder may be combined with elemental sulfur to form the potassium humate sulfur compound granule. In an example, the potassium humate sulfur compound granule may be manufactured using a batch or a continuous flow method depending on the manufacturing set up and/or product demand needs. The elemental sulfur, may in some instances, be in a molten form. In some instances, a non-molten sulfur may desired be heated until in a molten state. The molten sulfur is transported into a mixing tank, for example, by pumping and metering. Inside the mixing tank the potassium humate powder is added to the molten sulfur. In some embodiments, a bentonite clay may also be added as a binder. The mixture is continuously mixed, for example by stirring or blending, until the molten sulfur, potassium humate, and bentonite clay (if present) form one substantially homogenous mixture. The mixing tank and/or sulfur contained therein may be heated in order to maintain the sulfur in a molten state (e.g. above the melting temperature of sulfur—270 degrees Fahrenheit). Once homogenized, the molten mixture is moved from the mixing tank through a filter and pumped through a rotoformer and onto flat surface (e.g. a conveyor belt or the like), where the mixture may be generally pea-shaped and/or be in shape of a granule. Once on the flat surface, the mixture is cooled, forming solid potassium humate granules.

Resulting granules have been found to aid plant growth in both agricultural and horticultural applications. Various soil bacteria may convert the inert and insoluble elemental sulfur present in the granule to sulfate, and in turn sulfuric acid. For example, in calcareous soils, this sulfuric acid may cause fixed calcium carbonates and free lime to release calcium in soil solution, while the potassium humate (soluble humic acid) may alter the rhizodeposition and plant roots. This may result in a metamorphosis of overall root architecture, provide more root hair, and translocate the exchangeable calcium to the plant roots and plant tissues. The potassium humate also may simultaneously buffer, chelate, and complex macro-micronutrients, making them more readily available to roots and plants. Furthermore, due to its nanoparticle size the potassium humate (soluble humic acid) may create micropores for roots, water, and nutrients to reside, which may become oxygenated as a result of the dynamics of soil physics. Traditionally, about 70% to about 90% of sulfur present in soil is in the form of organic matter, which must be converted to sulfate by soil bacteria in order to be usable by plants. The combination of the potassium humate (soluble humic and) sulfur may enhance the conversion of sulfur to sulfate, resulting in a conversion rate from about 15% to about 70%. The conversation rate may be contingent upon dynamics such as soil temperature, moisture, and/or presence of autotropic bacteria. In another example, where the soil is sandy, irrigated, or has high rainfall amounts, the slow release of sulfur may create sulfate for immediate plant use (approximately 30%), while the remainder of the sulfur is activated to create sulfates and sulfuric acids in a long lasting manner with minimal leaching, which may ensure further sulfate formation at various stages of plant growth.

In an example, the application of postasium humate sulfur compound granules in conjunction with the nitrogen may enhance nitrogen to sulfur ratios in crops where the protein requirements are high. Such enhancement may be attributable to the creation of desirable soil texture and structure by the organosulfur complexes created by the application of the postasium humate sulfur compound granules to the soil. For example, the organosulfur complexes may loosen soil in tied clay soils creating adequate drainage, suitable aeration, and buffering properties. The creation of these organosulfur complexes may also result in, through various chemical pathways and the labyrinthine network of microorganisms, the decomposition of high molecular weight of organic materials, which may create up to 5,000 calories per gram of energy available for plant use.

Aspects of a process such as is described in various embodiments herein are further illustrated by the following further examples, which are set forth to illustrate certain aspects of a process such as is described in various embodiments herein and are not to be construed as limiting thereof.

Further Example 1

A process for making a potassium humate sulfur compound granule, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  spray drying the extraction component, thereby forming a plurality of powder particles;

adding the plurality of potassium humate particles to elemental sulfur, thereby forming a homogenized mixture; and solidifying at least a portion of the homogenized mixture under conditions wherein the at least a portion of the homogenized mixture is made into a form of a granule; thereby making a potassium humate sulfur compound granule.

Further Example 2

A process according to further example 1, wherein the carbonaceous substance comprises a coal and/or a claystone and/or a mudstone and/or a shale.

Further Example 3

A process according to further example 1, wherein the carbonaceous substance comprises a lignite and/or a Leonardite and/or a Humalite.

Further Example 4

A process according to further example 1, wherein the carbonaceous substance comprises a Humalite.

Further Example 5

A process according to further example 1, wherein the alkaline mixture comprises water.

Further Example 6

A process according to further example 1, wherein the alkaline mixture comprises a base.

Further Example 7

A process according to further example 1, wherein the alkaline mixture comprises sodium hydroxide or potassium hydroxide.

Further Example 8

A process according to further example 1, wherein the alkaline mixture comprises caustic potash solution.

Further Example 9

A process according to further example 1, wherein the alkaline mixture comprises, by mass, between about 10 and about 15 parts water, and about 1 part caustic potash solution, wherein the caustic potash solution is 45% membrane grade.

Further Example 10

A process according to further example 1, wherein the alkaline mixture comprises, by mass, about 73.7 parts water and about 5.8 parts caustic potash solution, wherein the caustic potash solution is 45% membrane grade.

Further Example 11

A process according to further example 1, wherein the mass ratio of the alkaline mixture to the sample is between about 75:25 and about 84:16.

Further Example 12

A process according to further example 1, wherein the mass ratio of the alkaline mixture to the sample is between about 78:22 and about 81:13.

Further Example 13

A process according to further example 1, wherein the mass ratio of the alkaline mixture to the sample is about 79.5:20.5.

Further Example 14

A process according to further example 1, wherein the sludge component is maintained in contact with the extraction component for between about 4 hours and about 12 hours.

Further Example 15

A process according to further example 1, wherein the sludge component is maintained in contact with the extraction component for between about 6 hours and about 10 hours.

Further Example 16

A process according to further example 1, wherein the sludge component is maintained in contact with the extraction component for about 8 hours.

Further Example 17

A process according to further example 1, wherein the sludge component is maintained in contact with the extraction component for a period of time sufficient for the extraction component to possess a humic acid content of at least about 6%.

Further Example 18

A process according to further example 1, wherein the sludge component is maintained in contact with the extraction component for a period of time sufficient for the extraction component to possess a humic acid content of at least about 14%.

Further Example 19

A process according to further example 1, wherein the sludge component is maintained in contact with the extraction component for a period of time sufficient for the extraction component to possess a humic acid content of at least about 17%.

Further Example 20

A process according to further example 1, wherein the sludge component is maintained in contact with the extraction component for a period of time sufficient for the extraction component to possess a humic acid content of at least about 18%.

Further Example 21

A process according to further example 1, wherein the separating is effected by filtration.

Further Example 22

A process according to further example 1, wherein the separating is effected by sedimentation.

Further Example 23

A process according to further example 1, wherein the drying is effected by spray drying.

Further Example 24

A process according to further example 1, wherein the drying is effected by spray drying, and wherein the spray drying is characterized by an inlet temperature and an outlet temperature, and wherein the inlet temperature passing through a burner heats to between about 400 degrees Fahrenheit and about 800 degrees Fahrenheit, and wherein the outlet temperature is between about 150 degrees Fahrenheit and about 250 degrees Fahrenheit.

Further Example 25

A process according to further example 1, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 26

A process according to further example 1, wherein the plurality of powder particles is characterized by a moisture content, and wherein the moisture content is between about 9% and about 15%.

Further Example 27

A process according to further example 1, wherein the plurality of powder particles is characterized by a moisture content, and wherein the moisture content is between about 10% and about 14%.

Further Example 28

A process according to further example 1, wherein the plurality of powder particles is characterized by a moisture content, and wherein the moisture content is between about 11% and about 13%.

Further Example 29

A process according to further example 1, wherein the plurality of powder particles is characterized by a loose bulk density, and wherein the loose bulk density is between about 28 and about 49 pounds per cubic foot.

Further Example 30

A process according to further example 1, wherein the plurality of powder particles is characterized by a loose bulk density, and wherein the loose bulk density is between about 31.5 and about 45.5 pounds per cubic foot.

Further Example 31

A process according to further example 1, wherein the plurality of powder particles is characterized by a loose bulk density, and wherein the loose bulk density is between about 35 and about 42 pounds per cubic foot.

Further Example 32

A process according to further example 1, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 33

A process according to further example 1, wherein the sulfur is a molten state ranging from about 230 degrees Fahrenheit to about 280 degrees Fahrenheit.

Further Example 34

A process according to further example 1, wherein the sulfur is in a solid state and heated to a range of about 230 degrees Fahrenheit to about 280 degrees Fahrenheit prior to the addition of the plurality of potassium humate particles.

Further Example 35

A process according to further example 1, wherein the homogenized mixture includes about 1 pound to about 200 pounds of the plurality of potassium humate powder particles per one ton (2000 pounds) of elemental sulfur.

Further Example 36

A process according to further example 1, wherein the homogenized mixture includes about 100 pounds of the plurality of potassium humate powder particles per one ton (2000 pounds) of elemental sulfur.

Further Example 37

A process according to further example 1, wherein the homogenized mixture includes about 5% potassium humate.

Further Example 38

A process according to further example 1, wherein the homogenized mixture further includes a binder, such as bentonite clay.

Further Example 39

A process according to further example 39, wherein the bentonite clay may be about 5% to about 15% of the homogenized mixture.

Further Example 40

A process according to further example 39, wherein the bentonite clay comprises about 10% of the homogenous mixture.

Further Example 41

A process according to further example 1, wherein the homogenized mixture is mixed for up to 10 hours.

Further Example 42

A process according to further example 1, wherein the homogenized mixture is mixed for up to five hours.

Further Example 43

A process according to further example 1, wherein the homogenized mixture is mixed for up to one hour.

Further Example 44

A process according to further example 1, wherein the solidifying is effected by an apparatus comprising a filter, rotoformer or drop former, and flat surface (e.g. conveyor belt).

Further Example 45

A process according to further example 44, wherein the filter size may be a 140 mesh filter, a 230 mesh filter, a 270 mesh filter, a 325 mesh filter, or a 400 mesh filter.

Further Example 46

A process according to further example 44, wherein the flat surface is a steel belt.

Further Example 47

A process according to further example 44, wherein the solidifying further includes cooling the mixture on the flat surface.

Further Example 48

A process according to further example 47, wherein the cooling is effectuated by spraying a cooled liquid solution (e.g., 40 to 50 degrees Fahrenheit), for example water, on the underside of the steel belt, resulting in the cooling of the belt and subsequently the homogenized mixture deposited thereon.

Further Example 49

A process according to further example 47, wherein the cooling is effectuated by moving the belt into, or through, a chiller. In some instances, such a chiller may be set to about 40 to 50 degrees Fahrenheit, although this is not to be understood as limiting.

Further Example 50

A process according to further example 47, wherein the cooling may be any other active means of cooling known in the art, such as other forms of refrigeration.

Further Example 51

A process according to further example 47, wherein the cooling may be a passive means of cooling; for example the cooling may be simply allowing the mixture to cool to room temperature without any further intervention.

Further Example 52

A process according to further example 1, wherein the potassium humate sulfur compound granule is between about 0.5 mm and about 4.5 mm.

Further Example 53

A process according to further example 1, wherein the potassium humate sulfur compound granule is between about 0.8 mm and about 4.0 mm.

Further Example 54

A process according to further example 1, wherein the potassium humate sulfur compound granule is between about 0.8 mm and about 2.0 mm.

Further Example 55

A process according to further example 1, wherein the potassium humate sulfur compound granule is between about 2.1 mm and about 4.0 mm.

Further Example 56

A process according to further example 1, wherein the potassium humate sulfur compound granule has a pH of at least 7.5.

Further Example 57

A process according to further example 1, wherein the potassium humate sulfur compound granule has a pH of 7.5 to about 12.

Further Example 58

A process according to further example 1, wherein the potassium humate sulfur compound granule has a pH of about 9.

Further Example 59

A process according to further example 1, wherein the process further includes applying the potassium humate sulfur compound granule to a desired site, such as an agriculture setting.

Further Example 60

A process according to further example 1, wherein the potassium humate sulfur compound granule has a potassium humate component and a sulfur component, and the potassium humate component of the granule solubilizes upon application to a desired site and enhances conversion of the sulfur component into sulfate.

Further Example 61

A process according to further example 1, wherein the potassium humate sulfur compound granule enhances the conversion of sulfur to sulfate by about 15% to about 70% as compared to elemental sulfur alone.

Aspects of a potassium humate sulfur compound granule such as is described in various embodiments herein are further illustrated by the following further examples, which are set forth to illustrate certain aspects of a process such as is described in various embodiments herein and are not to be construed as limiting thereof.

Further Example 62

A potassium humate sulfur compound granule, the granule made by a process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
  maintaining the sludge component in contact with the extraction component for a period of time sufficient for the extraction component to become relatively enriched in humic acid and the sludge component to become relatively depleted of humic acid;
  separating the sludge component from the extraction component;
  spray drying the extraction component, thereby forming a plurality of powder potassium humate particles;
  adding the plurality of potassium humate particles to elemental sulfur, thereby forming a homogenized mixture, wherein the plurality of potassium humate powder particles comprises about 5% of the homogenized mixture; and
  solidifying at least a portion of the homogenized mixture under conditions wherein the at least a portion of the homogenized mixture is made into a form of a granule;
  thereby making a potassium humate sulfur compound granule with a potassium humate component and a sulfur component,
    wherein the potassium humate sulfur compound granule has a pH of 7.5 to about 12, and
    wherein the potassium humate component of the granule solubilizes upon application to a desired site and enhances conversion of the sulfur component into sulfate.

Further Example 63

A potassium humate sulfur compound granule according to further example 62, wherein the carbonaceous substance comprises a coal and/or a claystone and/or a mudstone and/or a shale.

Further Example 64

A potassium humate sulfur compound granule according to further example 62, wherein the carbonaceous substance comprises a lignite and/or a Leonardite and/or a Humalite.

Further Example 65

A potassium humate sulfur compound granule according to further example 62 wherein the carbonaceous substance comprises a Humalite.

Further Example 66

A potassium humate sulfur compound granule according to further example 62, wherein the alkaline mixture comprises water.

Further Example 67

A potassium humate sulfur compound granule according to further example 62, wherein the alkaline mixture comprises a base.

Further Example 68

A potassium humate sulfur compound granule according to further example 62, wherein the alkaline mixture comprises sodium hydroxide or potassium hydroxide.

Further Example 69

A potassium humate sulfur compound granule according to further example 62, wherein the alkaline mixture comprises caustic potash solution.

Further Example 70

A potassium humate sulfur compound granule according to further example 62, wherein the alkaline mixture comprises, by mass, between about 10 and about 15 parts water, and about 1 part caustic potash solution, wherein the caustic potash solution is 45% membrane grade.

Further Example 71

A potassium humate sulfur compound granule according to further example 62, wherein the alkaline mixture comprises, by mass, about 73.7 parts water and about 5.8 parts caustic potash solution, wherein the caustic potash solution is 45% membrane grade.

Further Example 72

A potassium humate sulfur compound granule according to further example 62, wherein the mass ratio of the alkaline mixture to the sample is between about 75:25 and about 84:16.

Further Example 73

A potassium humate sulfur compound granule according to further example 62, wherein the mass ratio of the alkaline mixture to the sample is between about 78:22 and about 81:13.

Further Example 74

A potassium humate sulfur compound granule according to further example 62, wherein the mass ratio of the alkaline mixture to the sample is about 79.5:20.5.

Further Example 75

A potassium humate sulfur compound granule according to further example 62, wherein the sludge component is maintained in contact with the extraction component for between about 4 hours and about 12 hours.

Further Example 76

A potassium humate sulfur compound granule according to further example 62, wherein the sludge component is maintained in contact with the extraction component for between about 6 hours and about 10 hours.

Further Example 77

A potassium humate sulfur compound granule according to further example 62, wherein the sludge component is maintained in contact with the extraction component for about 8 hours.

Further Example 78

A potassium humate sulfur compound granule according to further example 62, wherein the sludge component is maintained in contact with the extraction component for a period of time sufficient for the extraction component to possess a humic acid content of at least about 6%.

Further Example 79

A potassium humate sulfur compound granule according to further example 62, wherein the sludge component is maintained in contact with the extraction component for a period of time sufficient for the extraction component to possess a humic acid content of at least about 14%.

Further Example 80

A potassium humate sulfur compound granule according to further example 62, wherein the sludge component is maintained in contact with the extraction component for a period of time sufficient for the extraction component to possess a humic acid content of at least about 17%.

Further Example 81

A potassium humate sulfur compound granule according to further example 62, wherein the sludge component is maintained in contact with the extraction component for a period of time sufficient for the extraction component to possess a humic acid content of at least about 18%.

Further Example 82

A potassium humate sulfur compound granule according to further example 62, wherein the separating is effected by filtration.

Further Example 83

A potassium humate sulfur compound granule according to further example 62, wherein the separating is effected by sedimentation.

Further Example 84

A potassium humate sulfur compound granule according to further example 62, wherein the drying is effected by spray drying.

Further Example 85

A potassium humate sulfur compound granule according to further example 62, wherein the drying is effected by spray drying, and wherein the spray drying is characterized by an inlet temperature and an outlet temperature, and wherein the inlet temperature passing through a burner heats to between about 400 degrees Fahrenheit and about 800 degrees Fahrenheit, and wherein the outlet temperature is between about 150 degrees Fahrenheit and about 250 degrees Fahrenheit.

Further Example 86

A potassium humate sulfur compound granule according to further example 62, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 87

A potassium humate sulfur compound granule according to further example 62, wherein the plurality of powder particles is characterized by a moisture content, and wherein the moisture content is between about 9% and about 15%.

Further Example 88

A potassium humate sulfur compound granule according to further example 62, wherein the plurality of powder particles is characterized by a moisture content, and wherein the moisture content is between about 10% and about 14%.

Further Example 89

A potassium humate sulfur compound granule according to further example 62, wherein the plurality of powder particles is characterized by a moisture content, and wherein the moisture content is between about 11% and about 13%.

Further Example 90

A potassium humate sulfur compound granule according to further example 62, wherein the plurality of powder particles is characterized by a loose bulk density, and wherein the loose bulk density is between about 28 and about 49 pounds per cubic foot.

Further Example 91

A potassium humate sulfur compound granule according to further example 62, wherein the plurality of powder particles is characterized by a loose bulk density, and wherein the loose bulk density is between about 31.5 and about 45.5 pounds per cubic foot.

Further Example 92

A potassium humate sulfur compound granule according to further example 62, wherein the plurality of powder particles is characterized by a loose bulk density, and wherein the loose bulk density is between about 35 and about 42 pounds per cubic foot.

Further Example 93

A potassium humate sulfur compound granule according to further example 62, wherein the plurality of humic acid enriched powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 94

A potassium humate sulfur compound granule according to further example 62, wherein the sulfur is a molten state ranging from about 230 degrees Fahrenheit to about 280 degrees Fahrenheit.

Further Example 95

A potassium humate sulfur compound granule according to further example 62, wherein the sulfur is in a solid state and heated to a range of about 230 degrees Fahrenheit to about 280 degrees Fahrenheit prior to the addition of the plurality of potassium humate particles.

Further Example 96

A potassium humate sulfur compound granule according to further example 62, wherein the homogenized mixture includes about 1 pound to about 200 pounds of the plurality of potassium humate powder particles per one ton (2000 pounds) of elemental sulfur.

Further Example 97

A potassium humate sulfur compound granule according to further example 62, wherein the homogenized mixture includes about 100 pounds of the plurality of potassium humate powder particles per one ton (2000 pounds) of elemental sulfur.

Further Example 98

A potassium humate sulfur compound granule according to further example 62, wherein the homogenized mixture further includes a binder, such as bentonite clay.

Further Example 99

A potassium humate sulfur compound granule according to further example 98, wherein the bentonite clay comprises about 5% to about 15% of the homogenized mixture.

Further Example 100

A potassium humate sulfur compound granule according to further example 98, wherein the bentonite clay is about 10% of the homogenized mixture.

Further Example 101

A potassium humate sulfur compound granule according to further example 62, wherein the homogenized mixture is mixed for up to 10 hours.

Further Example 102

A potassium humate sulfur compound granule according to further example 62, wherein the homogenized mixture is mixed for up to five hours.

Further Example 103

A potassium humate sulfur compound granule according to further example 62, wherein the homogenized mixture is mixed for up to one hour.

Further Example 104

A potassium humate sulfur compound granule according to further example 62, wherein the solidifying is effected by an apparatus comprising a filter, rotoformer or drop former, and flat surface (e.g. conveyor belt).

Further Example 105

A potassium humate sulfur compound granule according to further example 104, wherein the filter size may be a 140 mesh filter, a 230 mesh filter, a 270 mesh filter, a 325 mesh filter, or a 400 mesh filter.

Further Example 106

A potassium humate sulfur compound granule according to further example 104, wherein the flat surface is a steel belt.

Further Example 107

A potassium humate sulfur compound granule according to further example 62, wherein the solidifying further includes cooling the mixture on the flat surface.

Further Example 108

A potassium humate sulfur compound granule according to further example 107, wherein the cooling is effectuated by spraying a cooled liquid solution, for example water, on the underside of the steel belt, resulting in the cooling of the belt and subsequently the homogenized mixture deposited thereon.

Further Example 109

A potassium humate sulfur compound granule according to further example 107, wherein the cooling is effectuated by moving the belt into, or through, a chiller.

Further Example 110

A potassium humate sulfur compound granule according to further example 107, wherein the cooling may be any other active means of cooling known in the art, such as other types of refrigeration.

Further Example 111

A potassium humate sulfur compound granule according to further example 107, wherein the cooling may be a passive means of cooling; for example the cooling may be simply allowing the mixture to cool to room temperature without any further intervention.

Further Example 112

A potassium humate sulfur compound granule according to further example 62, wherein the granule is between about 0.5 mm and about 4.5 mm.

Further Example 113

A potassium humate sulfur compound granule according to further example 62, wherein the granule is between about 0.8 mm and about 4.0 mm.

Further Example 114

A potassium humate sulfur compound granule according to further example 62, wherein the granule is between about 0.8 mm and about 2.0 mm.

Further Example 115

A potassium humate sulfur compound granule according to further example 62, wherein the granule is between about 2.1 mm and about 4.0 mm.

Further Example 116

A potassium humate sulfur compound granule according to further example 62, wherein the potassium humate sulfur compound granule has a pH of about 9.

Further Example 117

A potassium humate sulfur compound granule according to further example 62, wherein the potassium humate sulfur compound granule is applied to a desired site, such as agricultural soil.

Further Example 118

A potassium humate sulfur compound granule according to further example 62, wherein the potassium humate sulfur compound granule enhances the conversion of sulfur to sulfate by about 15% to about 70% as compared to elemental sulfur alone.

Aspects of a potassium humate sulfur compound granule such as is described in various embodiments herein are further illustrated by the following further examples, which are set forth to illustrate certain aspects of the granule such as is described in various embodiments herein and are not to be construed as limiting thereof.

Further Example 119

A potassium humate sulfur compound granule comprising:
  a potassium humate component and an elemental sulfur component at a ratio of about 1:20;
  where the potassium humate sulfur compound granule is semi-soluble,
  wherein the potassium humate component of the granule fully solubilizes upon application to a desired location and enhances conversion of the sulfur component into sulfate by at least about 15% as compared to elemental sulfur alone; and
  wherein the potassium humate sulfur compound granule has a pH of 7.5 to about 12.

Further Example 120

A potassium humate sulfur compound granule according to further example 119, wherein the potassium humate sulfur compound granule has a pH of about 9.

Further Example 121

A potassium humate sulfur compound granule according to further example 119, wherein the potassium humate sulfur compound granule enhances conversion of the sulfur component into sulfate by at least 50% as compared to elemental sulfur alone.

Further Example 122

A potassium humate sulfur compound granule according to further example 119, wherein the potassium humate sulfur compound granule further includes a binding component.

Further Example 123

A potassium humate sulfur compound granule according to further example 119, wherein the binding component is bentonite clay.

Further Example 124

A potassium humate sulfur compound granule according to further example 119, wherein the compound granule ranges from about 0.5 mm to 4.5 mm in diameter.

Further Example 125

A potassium humate sulfur compound granule according to further example 119, wherein the granule is between about 0.8 mm and about 2.0 mm in diameter.

Further Example 126

A potassium humate sulfur compound granule according to further example 119, wherein the granule is between about 2.1 mm and about 4.0 mm in diameter.

Further Example 127

A potassium humate sulfur compound granule according to further example 119, wherein the desired location is an agricultural soil.

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A process for making a potassium humate sulfur compound granule, the process comprising:
  obtaining a sample of a carbonaceous substance comprising humic acid and one or more other substances;
  contacting the sample with an amount of potassium hydroxide, thereby forming an extraction mixture,
  the extraction mixture consisting essentially of a sludge component, the sludge component comprising, predominantly, the sample, and an extraction component, the extraction component comprising, predominantly, the potassium hydroxide;

maintaining the sludge component in contact with the extraction component for a period of time sufficient for the extraction component to become relatively enriched in humic acid and the sludge component to become relatively depleted of humic acid;

separating the sludge component from the extraction component;

spray drying the extraction component, thereby forming a plurality of potassium humate powder particles, wherein the plurality of potassium humate powder particles is characterized by a moisture content between about 9% and about 15%;

adding the plurality of potassium humate powder particles to elemental sulfur, thereby forming a homogenized mixture; and solidifying at least a portion of the homogenized mixture under conditions wherein the at least a portion of the homogenized mixture is made into a form of a granule;

thereby making the potassium humate sulfur compound granule.

2. The process of claim 1, wherein the elemental sulfur is a molten sulfur.

3. The process of claim 1, wherein the homogenized mixture includes about 1 pound to about 200 pounds of the plurality of potassium humate powder particles per one ton of elemental sulfur.

4. The process of claim 1, wherein the homogenized mixture includes about 100 pounds of the plurality of potassium humate powder particles per one ton of elemental sulfur.

5. The process of claim 1, wherein the plurality of potassium humate powder particles comprises about 5% of the homogenized mixture.

6. The process of claim 1, wherein the potassium humate sulfur compound granule has a pH of at least 7.5.

7. The process of claim 6, wherein the potassium humate sulfur compound granule has a pH of 7.5 to about 12.

8. The process of claim 6, wherein the potassium humate sulfur compound granule has a pH of about 9.

9. The process of claim 1, wherein the homogenized mixture further includes bentonite clay as a binder.

10. The process of claim 9, wherein the bentonite clay comprises about 10% of the homogenized mixture.

11. The process of claim 1, wherein the solidifying further includes:
   pumping the homogenized mixture through a rotoformer and onto a flat surface; and
   cooling the homogenized mixture on the flat surface.

12. A process for making a potassium humate sulfur compound granule, the process comprising:
   obtaining a sample of a carbonaceous substance comprising humic acid and one or more other substances;
   contacting the sample with an amount of potassium hydroxide, thereby forming an extraction mixture,
   the extraction mixture consisting essentially of a sludge component, the sludge component comprising, predominantly, the sample, and an extraction component, the extraction component comprising, predominantly, the potassium hydroxide;
   maintaining the sludge component in contact with the extraction component for a period of time sufficient for the extraction component to become relatively enriched in humic acid and the sludge component to become relatively depleted of humic acid;
   separating the sludge component from the extraction component;
   spray drying the extraction component, thereby forming a plurality of powder potassium humate particles, wherein the plurality of potassium humate powder particles is characterized by a moisture content between about 9% and about 15%;
   adding the plurality of powder potassium humate particles to elemental sulfur, thereby forming a homogenized mixture, wherein the plurality of potassium humate powder particles comprises about 5% of the homogenized mixture; and
   solidifying at least a portion of the homogenized mixture under conditions wherein the at least a portion of the homogenized mixture is made into a form of a granule;
   thereby making the potassium humate sulfur compound granule with a potassium humate component and a sulfur component,
      wherein the potassium humate sulfur compound granule has a pH of 7.5 to about 12, and
      wherein the potassium humate component of the granule solubilizes upon application to a desired site and enhances conversion of the sulfur component into sulfate.

13. The process of claim 12, wherein the potassium humate sulfur compound granule has a pH of about 9.

14. The process of claim 12, wherein the homogenized mixture further includes bentonite clay as a binder.

15. The process of claim 14, wherein the bentonite clay comprises about 10% of the homogenized mixture.

16. The process of claim 12, wherein the solidifying further includes:
   pumping the homogenized mixture through a rotoformer and onto a flat surface; and
   cooling the homogenized mixture on the flat surface.

* * * * *